(12) United States Patent
Schmitt

(10) Patent No.: US 8,153,000 B2
(45) Date of Patent: Apr. 10, 2012

(54) FLUID FILTER SEAL

(75) Inventor: Craig A. Schmitt, Phoenix, AZ (US)

(73) Assignee: Watts Water Technologies, Inc., North Andover, MA (US)

( * ) Notice: Subject to any disclaimer, the term of this patent is extended or adjusted under 35 U.S.C. 154(b) by 634 days.

(21) Appl. No.: 12/288,741

(22) Filed: Oct. 23, 2008

(65) Prior Publication Data

US 2009/0107905 A1 Apr. 30, 2009

Related U.S. Application Data

(60) Provisional application No. 60/982,748, filed on Oct. 26, 2007.

(51) Int. Cl.
*B01D 29/00* (2006.01)

(52) U.S. Cl. ...................................... 210/232; 210/450

(58) Field of Classification Search .................. 210/232, 210/236, 450
See application file for complete search history.

(56) References Cited

U.S. PATENT DOCUMENTS

| | | | | |
|---|---|---|---|---|
| 5,209,845 A | * | 5/1993 | Sims | 210/232 |
| 5,399,264 A | * | 3/1995 | Pulek et al. | 210/450 |
| 5,527,463 A | * | 6/1996 | Morgan, Jr. | 210/450 |
| 7,172,697 B2 | * | 2/2007 | Chikura et al. | 210/321.83 |

FOREIGN PATENT DOCUMENTS

FR 2854820 A1 * 11/2004

* cited by examiner

*Primary Examiner* — Fred Prince
(74) *Attorney, Agent, or Firm* — Edwards Wildman Palmer LLP; David J. Silvia; George N. Chaclas

(57) ABSTRACT

A filter assembly including first and second mating parts and a seal received in a groove of the first mating part. The seal includes a main body and a resiliently flexible, sloping skirt that extends from one side of the main body to a distal end spaced from the main body. The seal is sized so that the resiliently flexible skirt normally extends out of the groove of the first mating part when the skirt is not biased towards the main body. When the first mating part is slid against the second mating part, the second mating part causes the distal end of skirt of the seal to be biased into the groove and towards the main body of the seal.

20 Claims, 8 Drawing Sheets

FLUID FILTER SEAL

CROSS-REFERENCE TO RELATED APPLICATION

This application claims priority to U.S. Provisional Patent Application No. 60/982,748, filed Oct. 26, 2007, which is incorporated herein by reference.

TECHNICAL FIELD OF THE DISCLOSURE

The present disclosure relates generally to a fluid filter assembly and, more particularly, to a seal for use with a fluid filter assembly. Even more particularly, the present disclosure relates to a fluid seal of a filter bowl of a fluid filter assembly.

BACKGROUND OF THE DISCLOSURE

A fluid filter assembly generally includes a filter head, a filter bowl, and a filter element. The filter bowl contains the filter element and attaches to the filter head, with screw threads for example. The filter head includes an inlet for directing contaminated fluid into the bowl and an outlet for drawing the filtered fluid out of the filter element. During replacement or cleaning of the filter element, the filter bowl is removed from the filter head. If the bowl is secured to the head with the screw threads then the bowl is unscrewed from the head. Once the filter element has been cleaned, or replaced with a new element, then the bowl is screwed back onto the head until a fluid-tight connection is formed between the bowl and the head. In some assemblies, the filter bowl may include an adapter secured over an open end of the filter bowl to secure the filter element in the bowl and help direct fluid into and out of the bowl and the filter element.

What is still desired is a new and improved fluid filter assembly. What is also still desired is a new and improved seal for providing a fluid-tight seal within a removable filter bowl of the fluid filter assembly.

SUMMARY OF THE DISCLOSURE

The present disclosure provides exemplary embodiments of a new and improved seal for use in a removable filter bowl of a fluid filter assembly. According to one embodiment, the seal includes a main body and a resiliently flexible, sloping skirt that extends from one side of the main body to a distal end spaced from the main body. The seal is adapted to be received in a groove of a first mating part of a filter assembly and is sized so that the resiliently flexible skirt normally extends out of the groove when it is not biased towards the main body. When the first mating part (e.g., a filter bowl adapter) is slid against a second mating part (e.g., a filter bowl), the second mating part causes the distal end of the seal to be biased into the groove and towards the main body of the seal.

According to one aspect of the present disclosure, the seal is annular and the skirt is continuous and extends radially outwardly from the main body. The skirt includes a first portion that extends radially outwardly from a top of the side of the main body and a second portion that extends downward at an angle from the first portion to the distal end, at an angle (e.g., about 17°) with respect to the side of the main body. An outer segment of the distal end extends at an angle (e.g., about 30°) with respect to the side of the main body when the skirt is in an unbiased position.

According to another aspect of the present disclosure, the seal includes a lip protruding from an inwardly facing surface of the skirt adjacent the distal end of the skirt. The inwardly facing lip is adapted to contact the side of the main body when the skirt is biased towards the main body. The lip is divided into segment by slits. The slits are provided to allow fluid (e.g., from the filter bowl) to pass through the lip and between the skirt and the main body of the seal and provide sealing pressure against the skirt so that the skirt is forced against the second mating part (e.g., a filter bowl).

According to a further aspect of the present disclosure, the seal also includes a protrusion on an outwardly facing surface of the skirt that extends to the distal end of the skirt. The outwardly facing protrusion is adapted to maintain contact with the second mating part (e.g., a filter bowl) when the skirt is biased towards the main body. In one exemplary embodiment, the protrusion includes two continuous lips separated by a valley.

Additional aspects and advantages of the present disclosure will become readily apparent to those skilled in this art from the following detailed description, wherein only an exemplary embodiment of the present disclosure is shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF DRAWINGS

Reference is made to the attached drawings, wherein elements having the same reference character designations represent like elements throughout, and wherein.

DETAILED DESCRIPTION OF EXEMPLARY EMBODIMENTS

Figure 1:
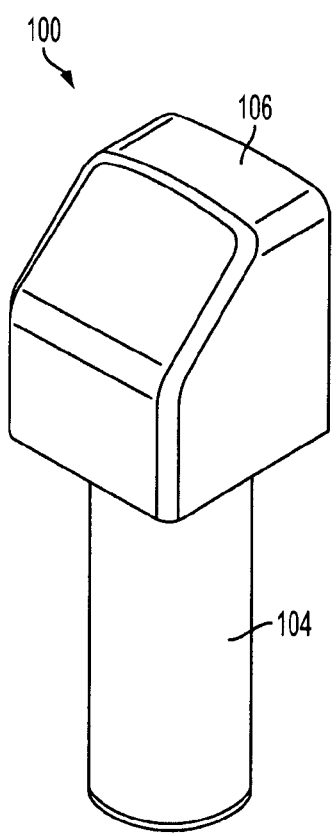
FIG. 1 is a top and side perspective view of a fluid filter assembly.
Figure 2:
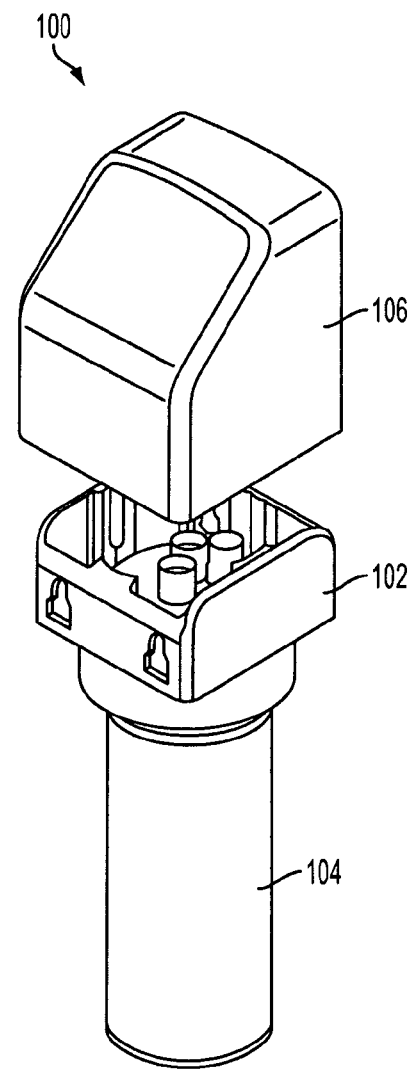
FIG. 2 is a top and side perspective view of the fluid filter assembly of FIG. 1, wherein a cap is shown removed to reveal a head of the assembly.
Figure 3:
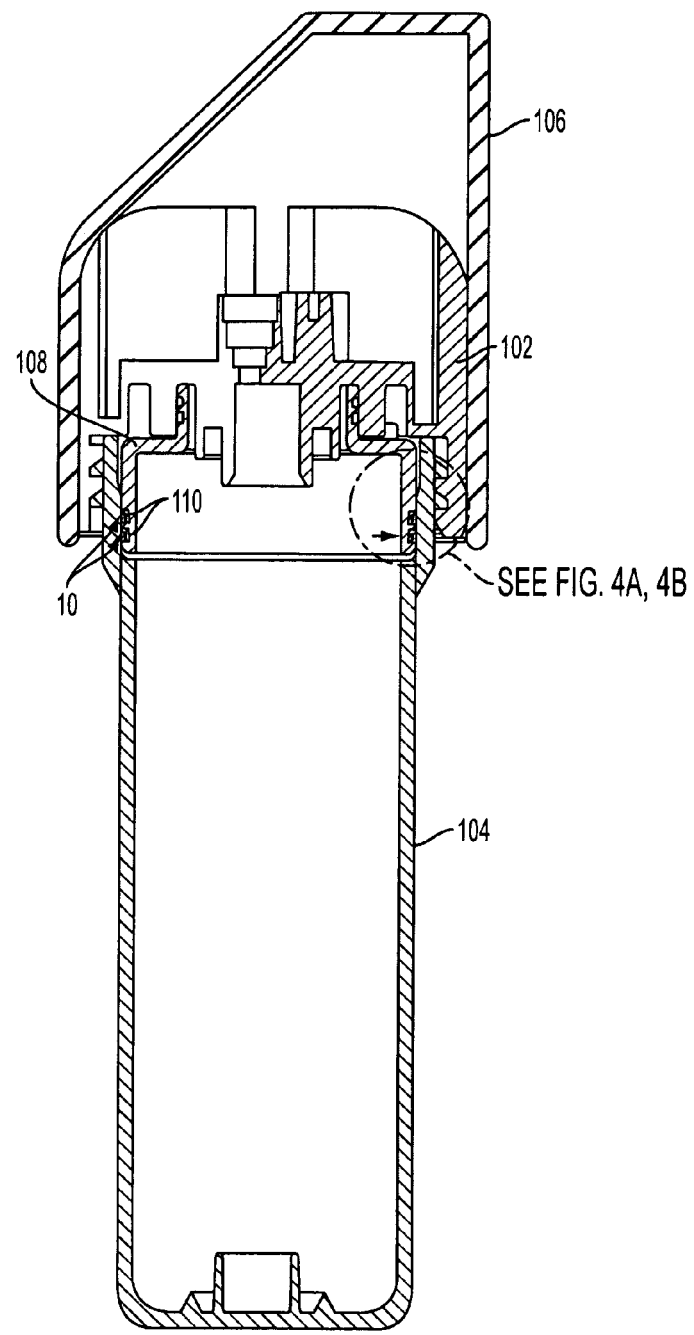
FIG. 3 is a sectional view of the assembly of FIG. 1, wherein there can be seen the cap, the filter head, a filter bowl secured to the filter head, an adapter secured between the filter head and the adapter, and two seals constructed in accordance with the present disclosure, wherein the two seals are located between the adapter and the filter bowl.

Referring to FIGS. 1-3 there is shown an exemplary embodiment of a fluid filter assembly 100 that includes a filter head 102, a filter bowl 104 secured to an open end of the filter bowl 104, and a decorative cap 106 covering the filter head 102. The filter bowl 104 is adapted to contain a filter element (not shown) and attaches to the filter head 102, with screw threads for example. The filter head 102 includes an inlet for directing contaminated fluid into the bowl 104 and an outlet for drawing the filtered fluid out of the filter element. During replacement or cleaning of the filter element, the filter bowl 104 is removed from the filter head 102. If the bowl 104 is secured to the head 102 with the screw threads then the bowl 104 is unscrewed from the head 102. Once the filter element has been cleaned, or replaced with a new element, then the bowl 104 is screwed back onto the head 102 until a fluid-tight connection is formed between the bowl 104 and the head 102. As shown in FIG. 3, the filter bowl 104 includes an adapter 108 secured over the open end of the filter bowl 104 for securing the filter element in the bowl 104 and directing fluid into and out of the bowl 104 and the filter element. In the exemplary embodiment shown, the adapter 108 is secured between the filter head 102 and the filter bowl 104.

Figure 4A:
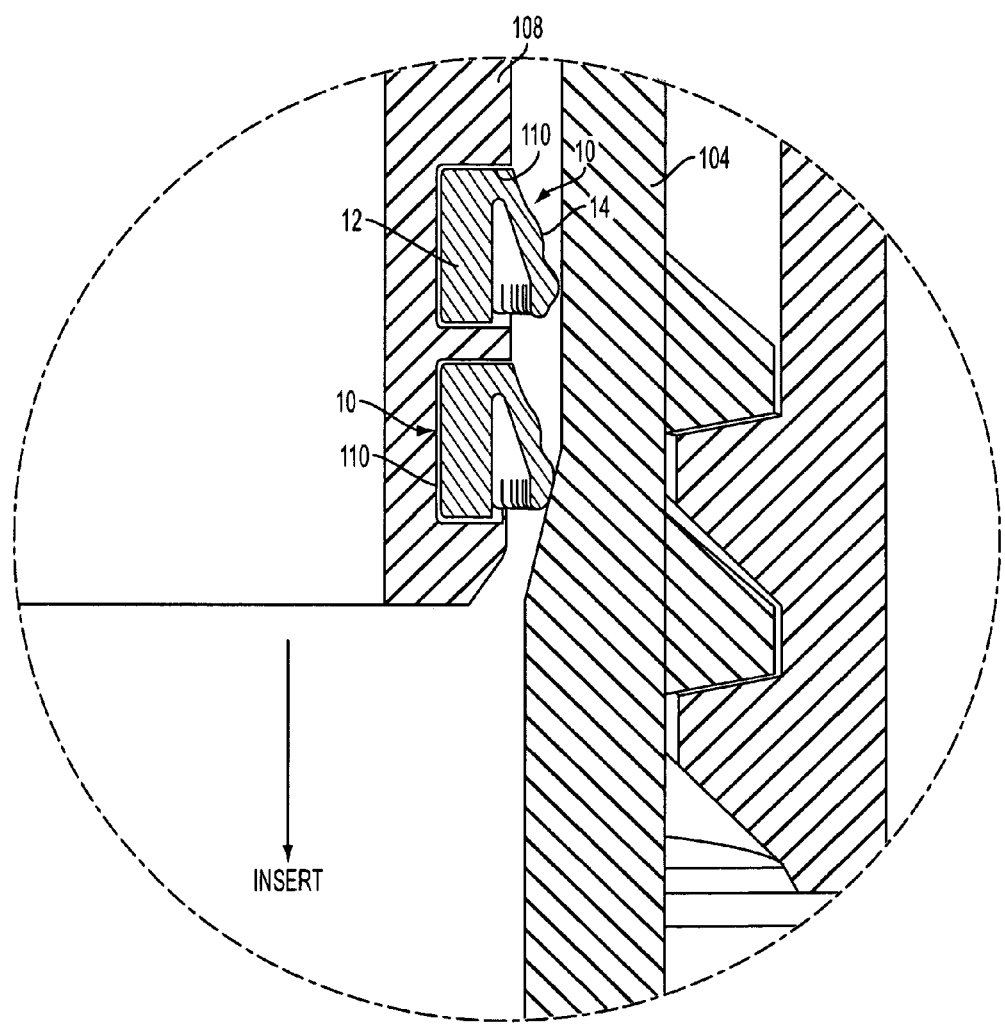
FIG. 4A is an enlarged view of the portion of the assembly contained in circle "4" of FIG. 3, wherein there is shown the adapter prior to being inserted into the filter bowl and skirts of the seals are shown in an unbiased position extending out of grooves in the adapter.
Figure 4B:
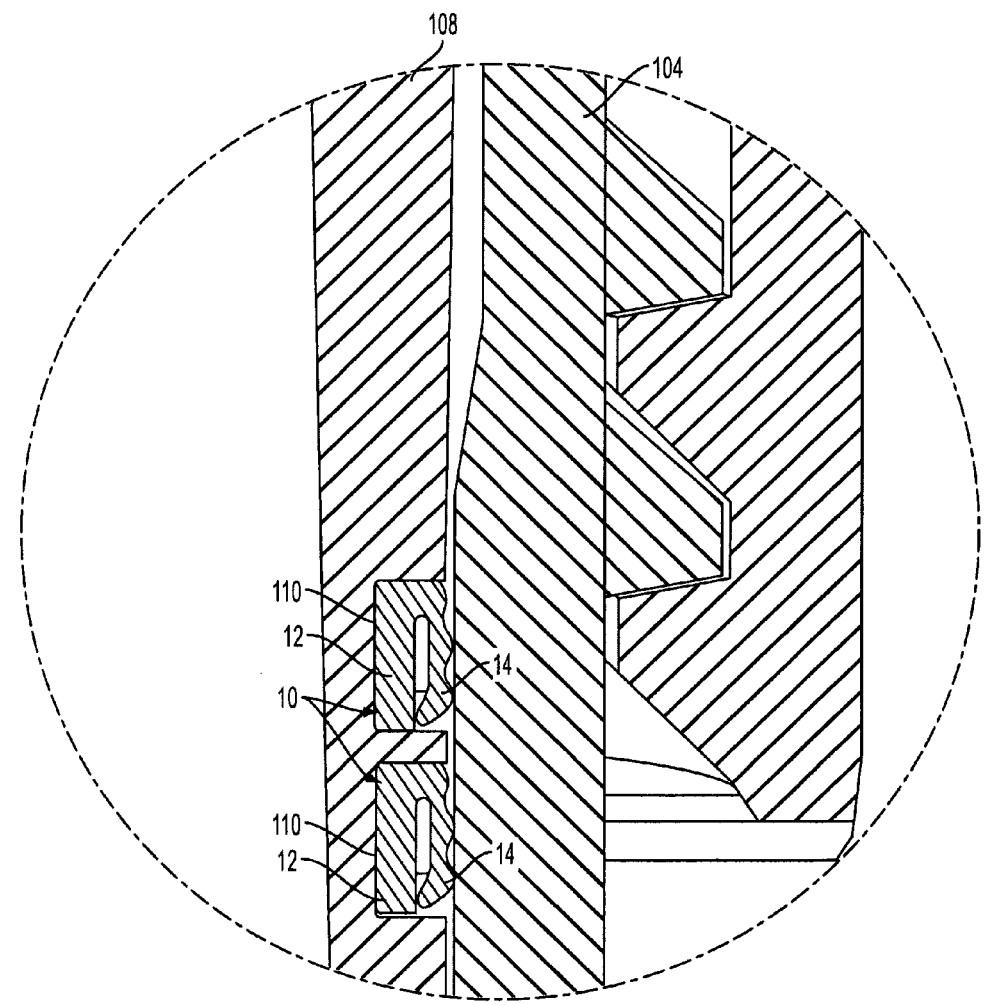
FIG. 4B is an enlarged view of the portion of the assembly contained in circle "4" of FIG. 3, wherein the adapter is shown inserted into the filter bowl and the skirts of the seals are shown biased into the grooves of the adapter.

Referring to FIGS. 3, 4A, and 4B, the filter assembly 100 includes two seals 10 constructed in accordance with the present disclosure that are received in circumferential grooves 110 in an outer sidewall of the adapter 108 and provide a fluid-tight closure between the adapter 108 and the filter bowl 104. As shown in FIGS. 4A, and 4B, each of the seals 10 includes a main body 12 and a resiliently flexible, sloping skirt 14 that extends from one side of the main body 12 to a distal end 16 spaced from the main body 12. The seal 10 is adapted to be received in the groove 110 of a first mating part (e.g., the adapter 108) of a filter assembly 100 and is sized so that the resiliently flexible skirt 14 normally extends out of the groove 110 when the skirt 14 is not biased towards the main body 12, as shown in FIG. 4A. When the first mating part (e.g., the adapter 108) is slid against a second mating part (e.g., the filter bowl 104), the second mating part causes the distal end 16 of the seal 10 to be biased into the groove 110 and towards the main body 12 of the seal 10, as shown in FIG. 4B.

Figure 5:
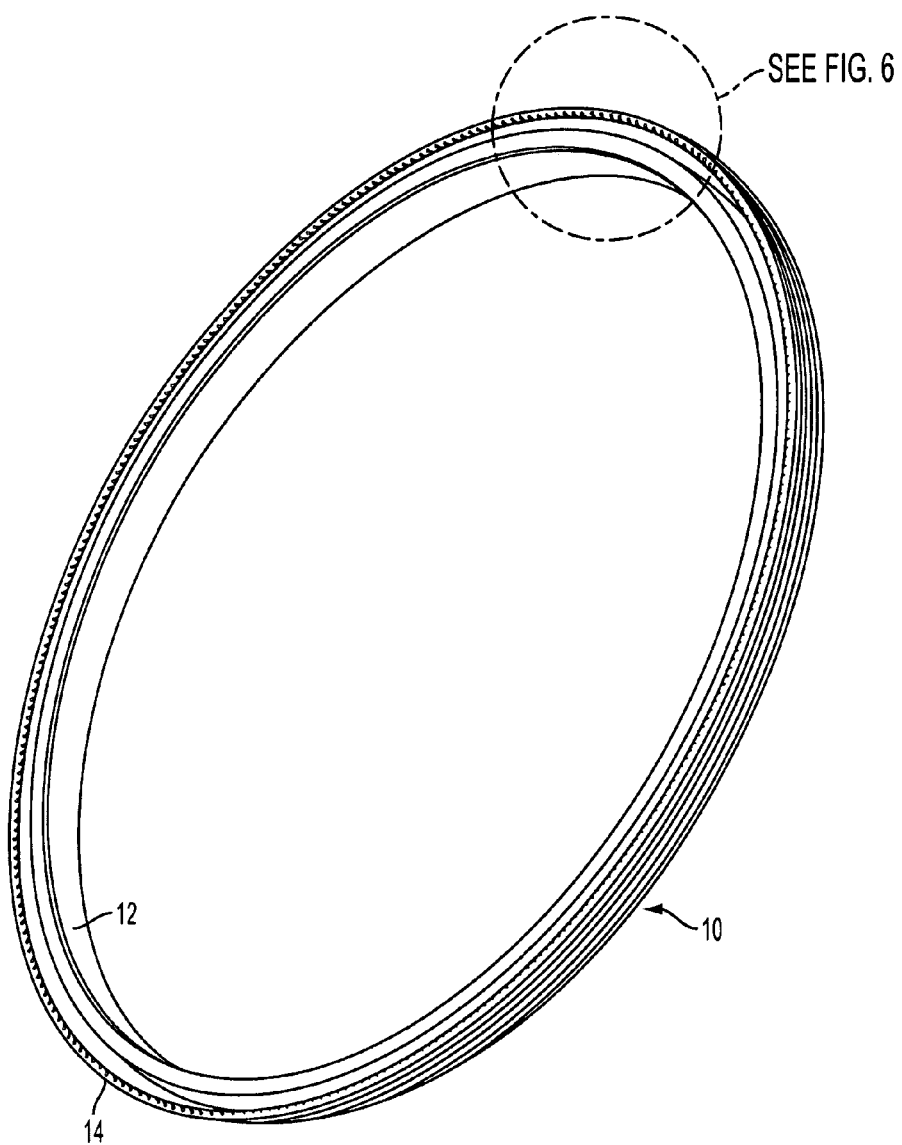
FIG. 5 is a bottom perspective view of one of the seals of FIG. 3.
Figure 9:
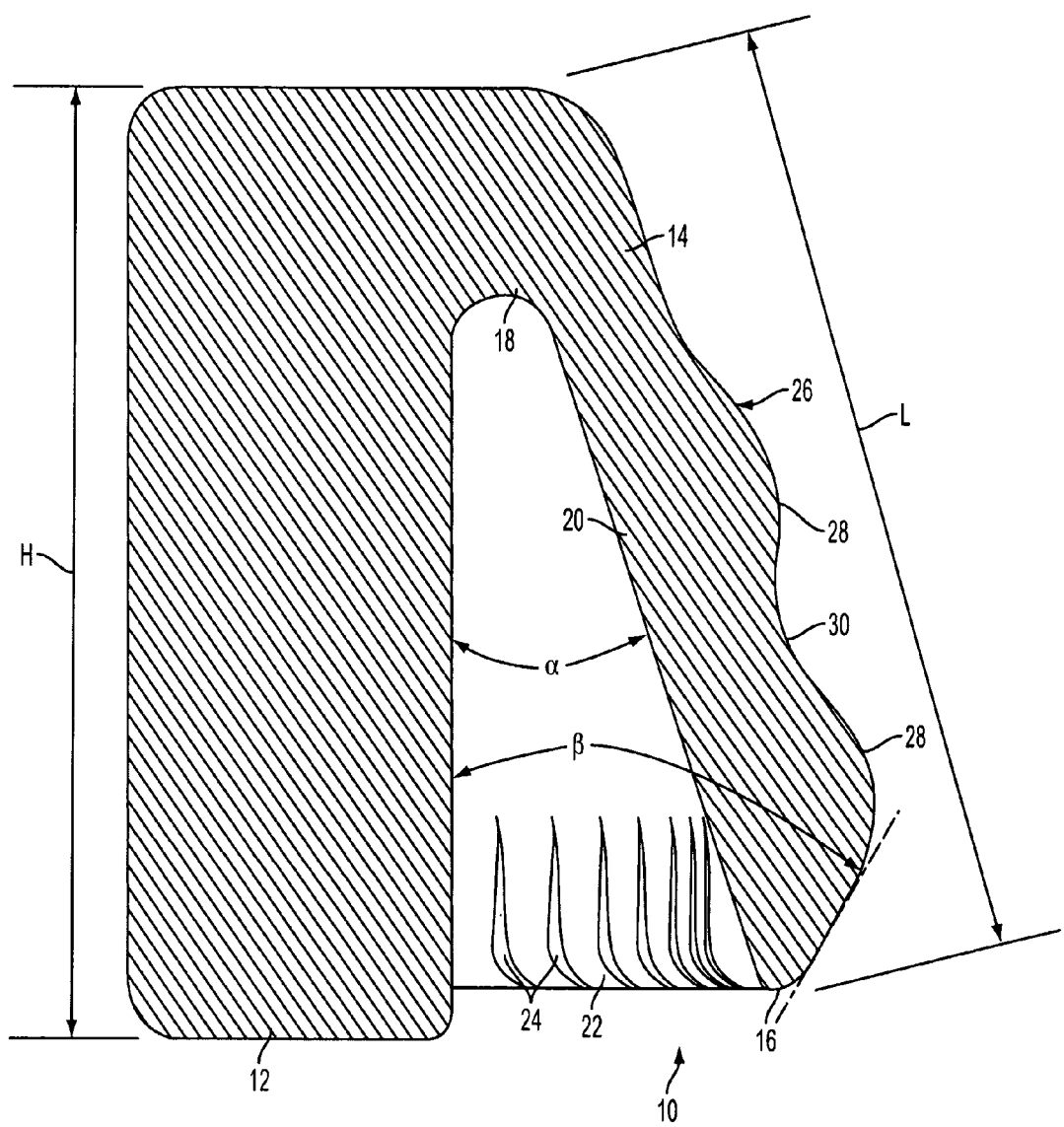
FIG. 9 is an enlarged sectional view of the seal of FIG. 5.

In the exemplary embodiment shown, the seal 10 is annular and the skirt 14 is continuous and extends radially outwardly from the main body 12, as shown in FIG. 5. Referring to FIG. 9, the skirt 14 includes a first portion 18 that extends radially outwardly from a top of the side of the main body 12 and a second portion 20 that extends downward at an angle from the first portion 18 to the distal end 16, at an angle "α" with respect to the side of the main body 12. In the exemplary embodiment shown, the angle "α" is equal to about 17°. An outer segment of the distal end 16 of the skirt 14 extends at an angle "β" with respect to the side of the main body 12 when the skirt 14 is in an unbiased position. In the exemplary embodiment shown, the angle "β" is equal to about 30°. As shown in FIG. 9, the main body 12 has a height "H" and the shirt has a length "L". In the exemplary embodiment shown, the length "L" of the skirt 14 is equal to the height "H" of the main body 12.

Figure 6:
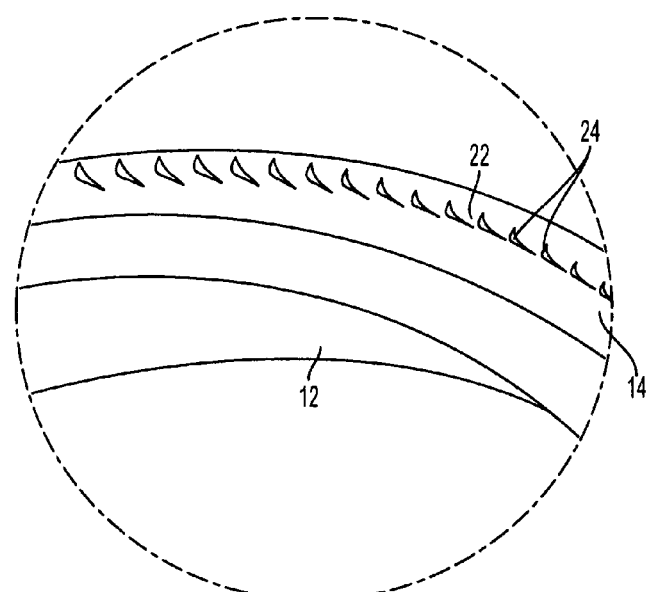
FIG. 6 is an enlarged perspective view of the portion of the seal contained in circle "6" of FIG. 5.
Figure 7:
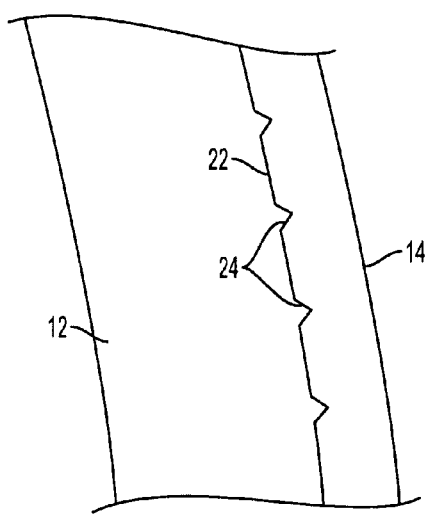
FIG. 7 is an enlarged bottom plan view of a portion of the seal of FIG. 5.
Figure 8:
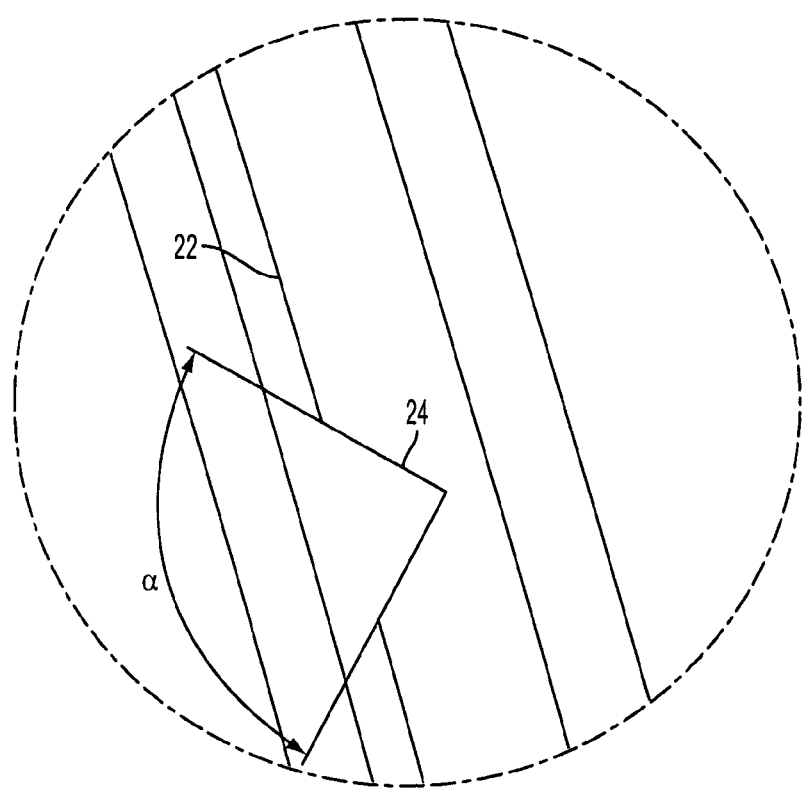
FIG. 8 is a further enlarged bottom plan view of a portion of the seal of FIG. 5.

The seal 10 also includes a lip 22 protruding from an inwardly facing surface of the skirt 14 adjacent the distal end 16 of the skirt 14. The inwardly facing lip 22 is adapted to contact the side of the main body 12 when the skirt 14 is biased towards the main body 12. The lip 22 is divided into segment by slits 24, as also shown in FIGS. 6-8. The slits 24 are provided to allow fluid (e.g., from the filter bowl 104) to pass through the lip 22 and between the skirt 14 and the main body 12 of the seal 10 and provide sealing pressure against the skirt 14 so that the skirt 14 is forced against the second mating part (e.g., the filter bowl 104). As shown in FIG. 8, each slit 24 has a v-shaped cross-section wherein opposing walls of the slits 24 are joined at an angle "γ". In the exemplary embodiment shown, the angle "γ" is equal to about 90°.

As shown best in FIG. 9, the seal 10 also includes a protrusion 26 on an outwardly facing surface of the skirt 14 that extends to the distal end 16 of the skirt 14. The outwardly facing protrusion 26 is adapted to maintain contact with the second mating part (e.g., the filter bowl 104) when the skirt 14 is biased towards the main body 12. In the exemplary embodiment shown, the protrusion 26 includes two continuous lips 28 separated by a valley 30.

Thus, the present disclosure provides a new and improved fluid seal that can be used in a water filtering system. It should be understood, however, that the exemplary embodiments described in this specification have been presented by way of illustration rather than limitation, and various modifications, combinations and substitutions may be effected by those skilled in the art without departure either in spirit or scope from this disclosure in its broader aspects and as set forth in the appended claims. Accordingly, other embodiments are within the scope of the following claims. In addition, the improved fluid seal disclosed herein, and all elements thereof, are contained within the scope of at least one of the following claims. No elements of the presently disclosed fluid seal are meant to be disclaimed.

What is claimed is:

1. A filter assembly comprising:
a first mating part;
a second mating part containing a filter element; and
a seal received in a circumferential groove of the first mating part and including,
an annular main body received in the groove, and
a resiliently flexible, sloping skirt that extends radially outwardly from one side of the main body to a distal end normally spaced from the main body,
wherein the seal is sized so that the resiliently flexible skirt normally extends out of the groove of the first mating part, but is biased into the groove and towards the annular main body of the seal when the first mating part is slid against the second mating part during mating.

2. A filter assembly according to claim 1, wherein the first mating part comprises an adapter and the second mating part comprises a filter bowl.

3. A filter assembly according to claim 2, wherein the groove is formed on a radially outward surface of the adapter and the radially outward surface of the adapter is secured against a radially inward surface of the filter bowl.

4. A filter assembly according to claim 3, further comprising a filter head, wherein a radially outward surface of the filter bowl is secured to the filter head.

5. A filter assembly according to claim 1, wherein the skirt is annular.

6. A filter assembly according to claim 5, wherein the skirt includes a first portion that extends radially outwardly from a top of the side of the main body and a second portion that extends downward at an angle from the first portion to the distal end.

7. A filter assembly according to claim 1, wherein the skirt extends at an angle "α" with respect to the side of the main body that is equal to about 17° when the skirt is in an unbiased position.

8. A filter assembly according to claim 1, wherein an outer segment of the distal end of the skirt is sloped and extends at an angle "β" with respect to the side of the main body when the skirt is in an unbiased position.

9. A filter assembly according to claim 8, wherein the angle "β" is equal to about 30°.

10. A filter assembly according to claim 1, wherein a length "L" of the skirt is about equal to a height "H" of the main body.

11. A filter assembly according to claim 1, wherein the seal also includes a lip protruding from an inwardly facing surface of the skirt adjacent the distal end of the skirt, the lip adapted to contact the side of the main body when the skirt is biased towards the main body.

12. A filter assembly according to claim 11, wherein the lip is divided into segment by slits for allowing fluid to pass through the lip and between the skirt and the main body and provide sealing pressure against the skirt so that the skirt is forced against the second mating part.

13. A filter assembly according to claim 12, wherein each of the slits of the lip has a v-shaped cross-section wherein opposing walls of the slits are joined at an angle "γ".

14. A filter assembly according to claim 13, wherein the angle "γ" is equal to about 90°.

15. A filter assembly according to claim 1, wherein the seal also includes a protrusion on an outwardly facing surface of the skirt that extends to the distal end of the skirt, the outwardly facing protrusion adapted to maintain contact with the second mating part when the skirt is biased towards the main body.

16. A filter assembly according to claim 15, wherein the protrusion includes two continuous lips separated by a valley.

17. A filter assembly according to claim 1, wherein a length "L" of the skirt is about equal to a height "H" of the main body.

18. A filter assembly comprising:
a filter head;
a filter bowl secured to the filter head and containing a filter element;
an adapter positioned between the filter head and the filter bowl, wherein a surface of the adapter is secured against a surface of the filter bowl and a circumferential groove is positioned on one of the surfaces of the adapter and the filter bowl; and
a seal received in the circumferential groove and including,
an annular main body received in the groove,
an annular, resiliently flexible, sloping skirt that extends from one side of the main body to a distal end normally spaced from the main body,
wherein the seal is sized so that the resiliently flexible skirt normally extends out of the groove, but is biased into the groove and towards the main body of the seal when the adapter is slid against the filter bowl during assembly,
a lip protruding from an inwardly facing surface of the skirt adjacent the distal end of the skirt and adapted to contact the side of the main body when the skirt is biased towards the main body, wherein the lip is divided into segments by slits for allowing fluid to pass through the lip and between the skirt and the main body and provide sealing pressure between the main body and the skirt, and
a protrusion on an outwardly facing surface of the skirt that extends to the distal end of the skirt.

19. A filter assembly according to claim 18, wherein the skirt extends at an angle "α" with respect to the side of the main body that is equal to about 17° when the skirt is in an unbiased position.

20. A filter assembly according to claim 18, wherein an outer segment of the distal end of the skirt is sloped and extends at an angle "β" with respect to the side of the main body when the skirt is in an unbiased position and wherein the angle "β" is equal to about 30°.

* * * * *